(12) United States Patent
Griffin

(10) Patent No.: US 8,327,134 B2
(45) Date of Patent: Dec. 4, 2012

(54) SYSTEM, METHOD AND PROGRAM PRODUCT FOR CHECKING REVOCATION STATUS OF A BIOMETRIC REFERENCE TEMPLATE

(75) Inventor: Phillip H. Griffin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 12/370,334

(22) Filed: Feb. 12, 2009

(65) Prior Publication Data

US 2010/0205431 A1 Aug. 12, 2010

(51) Int. Cl.
*H04L 9/23* (2006.01)
(52) U.S. Cl. ........ 713/158; 713/170; 713/172; 713/175; 713/186; 726/6; 726/26
(58) Field of Classification Search .................. 713/158, 713/170, 172, 175, 186; 726/6, 26
See application file for complete search history.

(56) References Cited

U.S. PATENT DOCUMENTS

| | | | |
|---|---|---|---|
| 5,467,081 A | 11/1995 | Drews et al. | |
| 5,649,099 A | 7/1997 | Theimer et al. | |
| 6,044,224 A | 3/2000 | Radia et al. | |
| 6,256,737 B1 | 7/2001 | Bianco et al. | |
| 6,554,188 B1 | 4/2003 | Johnson et al. | |
| 6,836,554 B1 * | 12/2004 | Bolle et al. | 382/116 |
| 7,030,760 B1 | 4/2006 | Brown | |
| 7,062,654 B2 * | 6/2006 | Millen et al. | 713/182 |
| 7,120,607 B2 | 10/2006 | Bolle et al. | |
| 7,298,243 B2 | 11/2007 | Juels et al. | |
| 7,302,583 B2 | 11/2007 | Forrest | |
| 7,310,734 B2 | 12/2007 | Boate et al. | |

(Continued)

FOREIGN PATENT DOCUMENTS

| | | |
|---|---|---|
| WO | 0065770 | 11/2000 |
| WO | WO 2005/122467 | 12/2005 |

OTHER PUBLICATIONS

ITU-T Telecommunication Standardization Sector of ITU, X.667, Series X: Data Networks and Open System Communications—OSI networking and system aspects—Naming, Addressing and Registration, ISO/IEC 9834-8: 2005 (E), 34 pages, Geneva, Switzerland 2005.

(Continued)

*Primary Examiner* — Kambiz Zand
*Assistant Examiner* — Yonas Bayou
(74) *Attorney, Agent, or Firm* — Schmeiser, Olsen & Watts; Anna Linne

(57) ABSTRACT

A system, method and program product for checking the revocation status of a biometric reference template. The method includes creating a revocation object for a reference template generated for an individual, where the revocation object contains first plaintext data providing a location for checking revocation status of the reference template and containing ciphertext data identifying the unique reference template identifier and a hash of the reference template. The method further includes providing the revocation object to a relying party requesting revocation status and sending a request to an issuer of the reference template for checking the revocation status of the reference template, without revealing identity of the individual. The method further includes returning results of the revocation status check to the relying party. In an embodiment, a random value is added to the ciphertext data for preserving privacy of the reference template holder.

25 Claims, 9 Drawing Sheets

U.S. PATENT DOCUMENTS

| | | | |
|---|---|---|---|
| 7,627,895 | B2 | 12/2009 | Gifford et al. |
| 7,671,746 | B2 | 3/2010 | Martinez de Velasco Cortina et al. |
| 7,739,744 | B2 * | 6/2010 | Burch et al. ............. 726/26 |
| 7,788,500 | B2 | 8/2010 | Okamura et al. |
| 7,936,905 | B2 | 5/2011 | Takahashi et al. |
| 8,001,387 | B2 | 8/2011 | Lee et al. |
| 8,086,867 | B2 * | 12/2011 | Freeman et al. ............ 713/186 |
| 8,242,892 | B2 | 8/2012 | Griffin |
| 2002/0026582 | A1 * | 2/2002 | Futamura et al. ............ 713/170 |
| 2002/0100803 | A1 | 8/2002 | Sehr |
| 2002/0174010 | A1 | 11/2002 | Rice |
| 2003/0088782 | A1 | 5/2003 | Forrest |
| 2003/0093666 | A1 * | 5/2003 | Millen et al. ................ 713/157 |
| 2003/0097383 | A1 | 5/2003 | Smirnov et al. |
| 2003/0115490 | A1 | 6/2003 | Russo et al. |
| 2003/0126433 | A1 * | 7/2003 | Hui ............................. 713/158 |
| 2003/0129965 | A1 | 7/2003 | Siegel |
| 2003/0189094 | A1 | 10/2003 | Trabitz |
| 2004/0019570 | A1 | 1/2004 | Bolle et al. |
| 2004/0020984 | A1 | 2/2004 | Clark |
| 2004/0123114 | A1 | 6/2004 | McGowan |
| 2004/0162984 | A1 * | 8/2004 | Freeman et al. ............ 713/175 |
| 2004/0193893 | A1 | 9/2004 | Braithwaite et al. |
| 2005/0005136 | A1 * | 1/2005 | Chen et al. ................. 713/186 |
| 2005/0038718 | A1 | 2/2005 | Barnes et al. |
| 2005/0055582 | A1 | 3/2005 | Bazakos et al. |
| 2005/0088320 | A1 | 4/2005 | Kovach |
| 2005/0180619 | A1 | 8/2005 | McClurg et al. |
| 2005/0198508 | A1 * | 9/2005 | Beck ............................ 713/170 |
| 2005/0229007 | A1 | 10/2005 | Bolle et al. |
| 2005/0240778 | A1 | 10/2005 | Saito |
| 2005/0283614 | A1 | 12/2005 | Hardt |
| 2006/0078171 | A1 | 4/2006 | Govindaraju et al. |
| 2006/0090079 | A1 | 4/2006 | Oh et al. |
| 2006/0104484 | A1 * | 5/2006 | Bolle et al. .................. 382/115 |
| 2006/0158751 | A1 | 7/2006 | McClurg et al. |
| 2006/0200683 | A1 | 9/2006 | King |
| 2006/0206723 | A1 | 9/2006 | Gil et al. |
| 2006/0267773 | A1 | 11/2006 | Roque |
| 2006/0289646 | A1 | 12/2006 | Shafer |
| 2006/0289648 | A1 | 12/2006 | Shafer |
| 2007/0040654 | A1 | 2/2007 | Lee et al. |
| 2007/0040693 | A1 | 2/2007 | Medve et al. |
| 2007/0044139 | A1 | 2/2007 | Tuyls et al. |
| 2007/0119924 | A1 | 5/2007 | Register, Jr. et al. |
| 2007/0136581 | A1 | 6/2007 | Hoghaug et al. |
| 2007/0164863 | A1 | 7/2007 | Himberger et al. |
| 2007/0180261 | A1 | 8/2007 | Akkermans et al. |
| 2007/0226512 | A1 | 9/2007 | Kevenaar et al. |
| 2007/0243932 | A1 | 10/2007 | Rothschild et al. |
| 2008/0024271 | A1 | 1/2008 | Oberman et al. |
| 2008/0037833 | A1 | 2/2008 | Takahashi et al. |
| 2008/0065895 | A1 | 3/2008 | Liu et al. |
| 2008/0072284 | A1 | 3/2008 | Horvitz et al. |
| 2008/0130882 | A1 | 6/2008 | Hagglund et al. |
| 2008/0157927 | A1 | 7/2008 | Soppera et al. |
| 2008/0162943 | A1 * | 7/2008 | Ali et al. ..................... 713/185 |
| 2008/0169909 | A1 | 7/2008 | Park et al. |
| 2009/0022374 | A1 * | 1/2009 | Boult ........................... 382/119 |
| 2009/0027207 | A1 | 1/2009 | Shelton et al. |
| 2009/0271635 | A1 | 10/2009 | Liu et al. |
| 2010/0201489 | A1 | 8/2010 | Griffin |
| 2010/0201498 | A1 | 8/2010 | Griffin |
| 2010/0205452 | A1 | 8/2010 | Griffin |
| 2010/0205658 | A1 | 8/2010 | Griffin |
| 2010/0205660 | A1 | 8/2010 | Griffin |
| 2010/0332838 | A1 | 12/2010 | Zhu et al. |

OTHER PUBLICATIONS

ITU-T Telecommunication Standardization Sector of ITU, X.667, Series X: Data Networks and Open System Communications—OSI networking and system aspects—Abstract Syntax Notation One (ASN.1), ISO/IEC 8824-1:2003 (E), 146 pages, Geneva, Switzerland 2005.

Griffin, P., ISO 19092: A Standard for Biometric Security Management, ISSA Journal, Jan. 2007, pp. 20-23.

Griffin, P., U.S. Appl. No. 12/370,345, System, Method and Program Product for Associating a Biometric Reference Template With a Radio Frequency Identification Tag, filed on Feb. 12, 2009.

Griffin, P., U.S. Appl. No. 12/370,359, System, Method and Program Product for Communicating a Privacy Policy Associated With a Biometric Reference Template, filed on Feb. 12, 2009.

Griffin, P., U.S. Appl. No. 12/370,365, System, Method and Program Product for Communicating a Privacy Policy Associated With a Radio Frequency Identification Tag and Associated Object, filed on Feb. 12, 2009.

Griffin, P., U.S. Appl. No. 12/370,379, System, Method and Program Product for Generating a Cancelable Biometric Reference Template on Demand, filed on Feb. 12, 2009.

Griffin, P., U.S. Appl. No. 12/370,350, System, Method and Program Product for Recording Creation of a Cancelable Biometric Reference Template in a Biometric Event Journal Record, filed on Feb. 12, 2009.

Berners-Lee, T. et al., Uniform Resource Identifiers (URI): Generic Syntax, RFC 2396, http://ietfreport.isoc.org/rfc/rfc2396.txt, Aug. 1998, pp. 1-40.

Molnar, et al.; Privacy for RFID Through Trusted Computing; WPES '05; Nov. 7, 2005; Alexandria, Virginia; pp. 31-34.

Juels, et al.; Soft Blocking: Flexible Blocker Tags on the Cheap; WPES '04; Oct. 28, 2004; Washington, D.C.; pp. 1-7.

Ratha, et al.; Generating Cancelable Fingerprint Templates; IEEE Transactions on Pattern Analysis and Machine Intelligence; vol. 29, No. 4; Apr. 2007; pp. 561-572.

Office Action (Mail Date Nov. 9, 2011) for U.S. Appl. No. 12/370,359, filed Feb. 12, 2009; Confirmation No. 5560.

Amendment filed Feb. 9, 2012 in response to Office Action (Mail Date Nov. 9, 2011) for U.S. Appl. No. 12/370,359, filed Feb. 12, 2009; Confirmation No. 5560.

Office Action (Mail Date Nov. 17, 2011) for Patent Application No. 12/370,365, filed Feb. 12, 2009; Confirmation No. 5569.

Amendment filed Feb. 9, 2012 in response to Office Action (Mail Date Nov. 17, 2011) U.S. Appl. No. 12/370,365, filed Feb. 12, 2009; Confirmation No. 5569.

Office Action (Mail Date Sep. 27, 2011) for Patent Application No. 12/370,379, filed Feb. 12, 2009; Confirmation No. 5597.

Amendment filed Dec. 12, 2011 in response to Office Action (Mail Date Sep. 27, 2011) for Patent Application No. 12/370,379, filed Feb. 12, 2009; Confirmation No. 5597.

Office Action (Mail Date Nov. 1, 2011) for Patent Application No. 12/370,345, filed Feb. 12, 2009; Confirmation No. 4437.

Amendment filed Jan. 30, 2012 in response to Office Action (Mail Date Nov. 1, 2011) for Patent Application No. 12/370,345, filed Feb. 12, 2009; Confirmation No. 4437.

Amendment filed May 8, 2012 in response to Final Office Action (Mail Date Mar. 9, 2012) for U.S. Appl. No. 12/370,345, filed Feb. 12, 2009; Confirmation No. 5537.

Advisory Action (Mail Date May 14, 2012) for U.S. Appl. No. 12/370,345, filed Feb. 12, 2009; Confirmation No. 5537.

Final Office Action (Mail Date May 14, 2012) for U.S. Appl. No. 12/370,379, filed Feb. 12, 2009; Confirmation No. 5597.

Notice of Allowance (Mail Date Mar. 30, 2012) for U.S. Appl. No. 12/370,365, filed Feb. 12, 2009; Confirmation No. 5569.

Final Office Action (Mail Date Mar. 9, 2012) for U.S. Appl. No. 12/370,345, filed Feb. 12, 2009; Confirmation No. 5537.

Office Action (Mail Date Mar. 13, 2012) for U.S. Appl. No. 12/370,350, filed Feb. 12, 2009; Confirmation No. 5548.

Amendment filed May 24, 2012 in response to Advisory Action (Mail Date May 14, 2012) for U.S. Appl. No. 12/370,345, filed Feb. 12, 2009; Confirmation No. 5537.

Notice of Allowance (Mail Date May 30, 2012) for U.S. Appl. No. 12/370,345, filed Feb. 12, 2009; Confirmation No. 5537.

Amendment filed Jul. 13, 2012 in response to Final Office Action (Mail Date May 14, 2012) for U.S. Appl. No. 12/370,379, filed Feb. 12, 2009; Confirmation No. 5597.

Notice of Allowance (Mail Date Jun. 21, 2012) for U.S. Appl. No. 12/370,359, filed Feb. 12, 2009; Confirmation No. 5560.

Amendment filed Jun. 12, 2012 in response to Office Action (Mail Date Mar. 13, 2012) for U.S. Appl. No. 12/370,350, filed Feb. 12, 2009; Confirmation No. 5548.

Final Office Action (Mail Date Jul. 13, 2012) for U.S. Appl. No. 12/370,350, filed Feb. 12, 2009; Confirmation No. 5548.
Advisory Action (Mail Date Jul. 26, 2012) for U.S. Appl. No. 12/370,379, filed Feb. 12, 2009; Confirmation No. 5597.
Request for Continued Examination filed Aug. 14, 2012 for U.S. Appl. No. 12/370,379, filed Feb. 12, 2009; Confirmation No. 5597.
U.S. Appl. No. 13/611,000, filed Sep. 12, 2012; Confirmation No. 8823.
Amendment After Final filed Sep. 12, 2012 in response to Final Office Action (Mail Date Jul. 13, 2012) for U.S. Appl. No. 12/370,350, filed Feb. 12, 2009; Confirmation No. 5548.
Notice of Allowance (Mail Date Sep. 12, 2012) for U.S. Appl. No. 12/370,379, filed Feb. 12, 2009; Confirmation No. 5597.

* cited by examiner

SYSTEM, METHOD AND PROGRAM PRODUCT FOR CHECKING REVOCATION STATUS OF A BIOMETRIC REFERENCE TEMPLATE

FIELD OF THE INVENTION

The present invention relates to computer systems and software, and more specifically to a technique for use in checking revocation status of a biometric reference template to ensure that the biometric reference template is still valid, while protecting the privacy of the user or individual.

BACKGROUND OF THE INVENTION

To determine if a biometric reference template has been revoked, a relying party must check its revocation status to ensure that the template is still valid, even though its validity period has not yet expired. Not checking the revocation status of a biometric reference template exposes a relying party to risk of accepting as a valid template, a template that has been revoked by the template issuer. However, checking the revocation status of a biometric reference template can reveal the identity of the biometric reference template holder. As such, there is a need to provide an efficient mechanism for use in checking the revocation status of a biometric reference template, while preserving privacy of the individual whose biometric data is contained on a biometric reference template, referred to as a "template holder".

SUMMARY OF THE INVENTION

The present invention resides in a system, method and program product for use in checking revocation status of a biometric reference template to ensure that the biometric reference template is still valid, while protecting the privacy of the user or individual, in accordance with an embodiment of the invention. The method for checking revocation status of a biometric reference template includes creating a reference template revocation object for a biometric reference template generated for an individual, the reference template revocation object containing a first set of plaintext data providing a location for checking revocation status of the biometric reference template and containing ciphertext data corresponding to a second set of plaintext data identifying the unique biometric reference template identifier and a hash of the biometric reference template, providing the reference template revocation object created to a relying party requesting revocation status of the biometric reference template and sending a request to an issuer of the biometric reference template for checking the revocation status of the biometric reference template, without revealing identity of the individual. The method further includes returning results of the revocation status check for the biometric reference template to the relying party. In an embodiment, the creating step further includes generating the biometric reference template having a unique biometric reference template identifier assigned thereto that uniquely identifies biometric data processed from a sample collected for the individual. In an embodiment, the creating step further includes adding a random value to the second set of plaintext data to be ciphered to create the ciphertext data for the template revocation object and injecting the reference template revocation object created into a security token device issued to the individual, where the random value added to the second set of plaintext data produces a different calculated encrypted value each time the template revocation object is encrypted. In an embodiment, the sending step further includes deciphering, using a cryptographic key in sole possession of the issuer, the ciphertext data to obtain the unique biometric reference template identifier and the hash of the biometric reference template for checking revocation status of the biometric reference template, where the identity of the individual is not revealed. In an embodiment, the first set of plaintext data includes at least one of: a URI (Uniform Resource Identifier) or a UUID (Universally Unique Identifier).

In another aspect, the invention provides a system for checking revocation status of a biometric reference template. The system includes a biometric application for creating a biometric reference template having a unique biometric reference template identifier that uniquely identifies a biometric sample collected from an individual, a revocation status tool for creating a reference template revocation object associated with the biometric reference template for checking revocation status of the biometric reference template without revealing the unique biometric reference template identifier, the reference template revocation object containing a first set of plaintext data providing a location for checking the revocation status of the biometric reference template and containing ciphertext data containing a second set of plaintext data identifying the unique biometric reference template identifier and a hash of the biometric reference template, an authentication tool for enciphering, using a cryptographic key in sole possession of an issuer of the biometric reference template, the second set of plaintext data contained in the reference template revocation object to form the ciphertext data identifying the unique biometric reference template and the hash of the biometric reference template and for deciphering the ciphertext data for checking revocation status of the biometric reference template without revealing identity of the individual and a reader device for reading the revocation status of the biometric reference template and for communicating the revocation status read for the biometric reference template to a relying party. The system further includes a security token device dispensed to the individual corresponding to the biometric reference template, where the security token device securely stores the reference template revocation object created therein. In an embodiment, the security token device further includes an encryption key for encrypting the reference template revocation object and
a signature key for signing the reference template revocation object. In an embodiment, the template revocation object further includes a random value added to the ciphertext data contained in the template revocation object to scramble a calculated encrypted value of the ciphertext data during authentication. In an embodiment, the authentication tool verifies the signature associated with the template revocation object created for the biometric reference template. The system further includes an identification tool for assigning the unique biometric reference template identifier for uniquely identifying the biometric reference template. In an embodiment, the signed reference template revocation object is provided to the relying party for checking revocation status of the biometric reference template, without revealing the identity of the individual. In an embodiment, the plaintext data includes at least one of: a URI (Uniform Resource Identifier) or a UUID (Universally Unique Identifier).

In yet another aspect, the invention provides a computer program product for checking revocation status of a biometric reference template. The computer program product includes a computer readable storage medium, first program instructions to create a reference template revocation object for a biometric reference template generated for an individual, the reference template revocation object containing a first set of plaintext data providing a location for checking revocation status of the biometric reference template and containing ciphertext data corresponding to a second set of plaintext data identifying the unique biometric reference template identifier and a hash of the biometric reference template, second program instructions to inject the reference template revocation object created into a security token device and third program instructions to access the location for checking revocation status of the biometric reference template without revealing the unique biometric reference template identifier assigned to the biometric reference template generated for the individual, where the ciphertext data may only be recovered by an issuer of the biometric reference template in possession of a cryptographic key. In an embodiment, each of the first, second and third program instructions are recorded on the computer readable storage medium for execution by the central processing unit. The computer program product further includes fourth program instructions to add a random value to the ciphertext data contained in the template revocation object to obtain a different calculated encrypted value during authentication, where the fourth program instructions are stored on the computer readable storage medium for execution by the central processing unit. In an embodiment, the first program instructions include instructions to generate a biometric reference template having the unique biometric reference template identifier assigned thereto that uniquely identifies biometric data processed from a sample collected for the individual. In an embodiment, the ciphertext data is decrypted, using the cryptographic key in sole possession of the issuer, to recover the unique biometric reference template identifier and the hash of the biometric reference template, without revealing identity of the individual. In an embodiment, the plaintext data includes at least one of: a URI (Uniform Resource Identifier) or a UUID (Universally Unique Identifier). In an embodiment, the third program instructions include instructions to utilize the unique biometric reference template identifier and the hash of the biometric reference template for identifying and locating the biometric reference template whose revocation status is to be checked and to return results of checking the revocation status of the biometric reference template to a relying party.

Further, in another aspect, the invention provides a process for deploying computing infrastructure includes integrating computer-readable code into a computing system, where the code in combination with the computing system is capable of performing a process for checking revocation status of a biometric reference template. The process includes generating a biometric reference template having a unique biometric reference template identifier assigned thereto that uniquely identifies biometric data processed from a sample collected for an individual, creating a reference template revocation object for a biometric reference template generated for an individual, the reference template revocation object containing a first set of plaintext data providing a location for checking revocation status of the biometric reference template and containing ciphertext data corresponding to a second set of plaintext data identifying the unique biometric reference template identifier and a hash of the biometric reference template. Further, the process includes providing the reference template revocation object created to a relying party requesting revocation status of the biometric reference template and sending a request to an issuer of the biometric reference template for checking the revocation status of the biometric reference template, without revealing identity of the individual. In an embodiment, the providing step further includes adding a random value to the ciphertext data contained in the template revocation object to obtain a different calculated encrypted value during authentication. In an embodiment, the sending step further includes utilizing the unique biometric reference template identifier and the hash of the biometric reference template for identifying and locating the biometric reference template whose revocation status is to be checked and returning results of checking the revocation status of the biometric reference template to a relying party. In an embodiment, the ciphertext data is encrypted using a cryptographic key chosen by and known only to the issuer of the biometric reference template and where the ciphertext data is decrypted using the cryptographic key for recovering the unique biometric reference template identifier and the hash of the biometric reference template. In an embodiment, the plaintext data includes at least one of: a URI (Uniform Resource Identifier) or a UUID (Universally Unique Identifier).

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
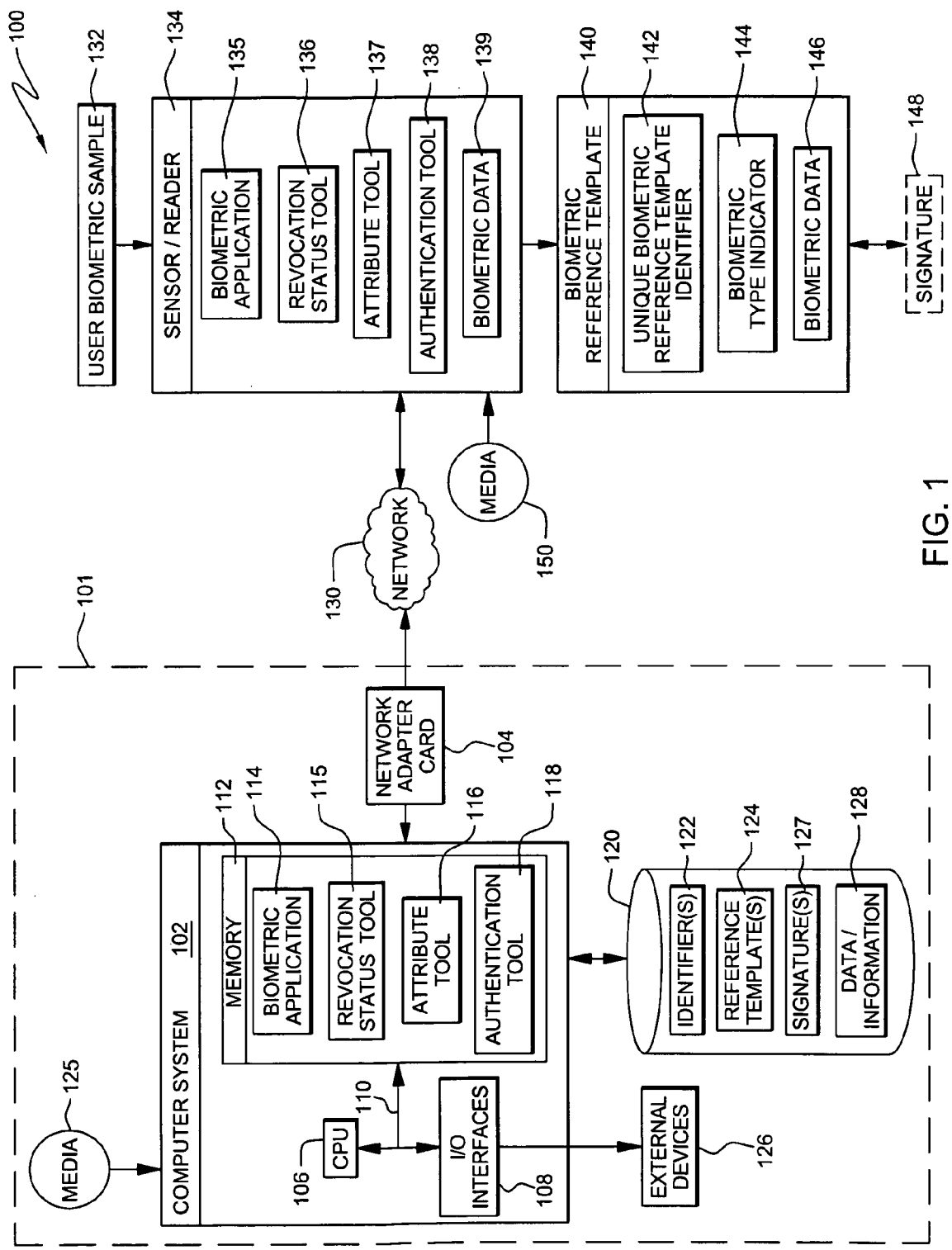
FIG. 1 is a block diagram depicting an embodiment of a computer infrastructure for use in checking the revocation status of a biometric reference template, in accordance with an embodiment of the present invention.

In one embodiment, the invention provides a computer infrastructure 100 that includes a computer system 102 having a revocation status tool for use in checking the revocation status of a biometric reference template, in accordance with an embodiment of the invention. In an embodiment, as depicted in FIG. 1, computer system or server 102 is intended to represent any type of computer system that is maintained in a secure environment, that is, for which access control is enforced (as represented by the dotted lines indicated by reference numeral 101). Referring to FIG. 1, the computer system or server 102 is shown to include a CPU (Central CPU) 106, a memory 112, a bus 110, and input/output (I/O) interfaces 108. Further, the server 102 is shown in communication with external I/O devices/resources 126 and database 120. In general, CPU 106 executes computer program code stored in memory 112, such as the biometric application 114 for processing biometric data contained in a biometric sample 132. Further, the memory 112 has a revocation status tool 115 stored thereon for use in checking the revocation status of a biometric reference template, as discussed further herein below with respect to FIGS. 2, 3, 4A and 4B. In addition, the memory 112 has stored or loaded thereon an attribute tool 116 for creating or defining one or more attributes to be included in the biometric reference template (also referred to herein as simply "biometric reference template" or "reference template" or "base template" or "base reference template") that is created using an individual's biometric sample 132. Further, memory 112 stores an authentication tool 118 for signing respective biometric reference templates and/or attributes associated with the respective biometric reference templates. In an embodiment, the one or more biometric reference templates 140 that are created using a biometric sample 132 collected from an individual are stored in the database 120 (shown as reference numeral 124) within computer system or server 102. In an embodiment, one or more unique identifier(s) 122, for instance, template identifiers that uniquely identify respective biometric reference templates 124 are also stored in database 120. Further, in an embodiment, unique privacy policy identifiers that uniquely identify respective privacy policies that are associated with respective biometric reference templates 124 may be also stored in database 120. Further, in an embodiment, any biometric data 128 and/or information processed by the biometric sensor or reader device 134 are transmitted to the computer system or server 102 for storage in database 120. In particular, as shown in FIG. 1, a user or individual provides a biometric sample 132 using a biometric sensor or a biometric reader or scanning device 134 coupled to the computer system 102 via network 130. In an embodiment, the biometric sensor or reader or scanner 134 converts the scanned user biometric sample 132 to a digital form using the biometric application 114 deployed on the computer system 102. In an embodiment, the biometric application 114 deployed on the computer system 102 is loaded into memory 112 of the computer system 102 from a computer readable storage medium or media (reference numeral 125), such as, a magnetic tape or disk, optical media, DVD, memory stick, semiconductor memory, etc. or downloaded from the server via a network adapter card (reference numerals 104) installed on the computer system or server 102. In an embodiment, the CPU 106 executes the biometric application 114 loaded in memory 112 of computer system 102 to take control of and use the sensor or reader device 134. Similarly, the CPU 106 executes the revocation status tool 115 loaded in memory 112 of computer system 102 to take control of and use the sensor or reader device 134. Additionally, the CPU 106 executes the attribute tool 116 and authentication tool 18 loaded in memory 112 of computer system 102 to take control of and use the sensor or reader device 134. In particular, the biometric application 114 loaded into the computer system 102 is executed to take control of the biometric sensor or reader device 134 for processing the biometric sample 132 collected from a person or an individual or user into biometric data 139. In an alternative embodiment (as shown in FIG. 1), an instance 135 of the biometric application 114 deployed on the computer system 102 is loaded into the sensor or reader device 134 within the biometric infrastructure 100 from a computer readable storage medium or media (reference numeral 150), such as, a magnetic tape or disk, optical media, DVD, memory stick, semiconductor memory, etc. or downloaded from the server via a network adapter card (reference numerals 104) installed on the computer system or server 102. Similarly, an instance 136 of the revocation status tool 115 is stored on the sensor or reader 134. Additionally, an instance 137 of the attribute tool 116 and an instance 138 of the authentication tool 118 is loaded into the sensor or reader device 134 within the biometric infrastructure 100 from a computer readable storage medium or media (reference numeral 150), such as, a magnetic tape or disk, optical media, DVD, memory stick, semiconductor memory, etc. or downloaded from the server via a network adapter card (reference numerals 104) installed on the computer system or server 102. In particular, the instance 135 of the biometric application 114 loaded into the biometric sensor or reader device 134 is used to process the biometric sample 132 collected from a person or an individual or user into biometric data 139, which, in an embodiment, is stored within the biometric sensor or reader device 134. Further, in an embodiment, the biometric data 139 processed from the biometric sample 132 is stored within the biometric sensor or reader device 134. Further, the biometric data 139 processed by the sensor or reader device 134 is used to create an information object, namely, a biometric reference template 140. In an embodiment, the computer system 102 uses the attribute tool or program 116 for creating one or more attributes to be associated with or attached to the biometric reference template 140. Further, the computer system 102 uses the authentication tool or program 118 for signing a biometric reference template that is created. Further, the authentication tool 118 is used to sign any attributes that are associated with and/or included in the biometric reference template 140. Additionally, the authentication tool 118 is used to sign a respective biometric reference template that is created, shown by the dotted "signature" outline (reference numeral 148) at the bottom of FIG. 1. In an embodiment, the base biometric reference template 140 created is assigned a unique biometric reference template identifier 142 (also referred to herein simply as "template identifier") for uniquely identifying the biometric reference template 140 created using a person's biometric data 139 that is processed from the person's biometric sample 132. In an embodiment, the unique base template identifier 142 is created in the form of an information object identifier (OID) as defined in ISO/IEC 8824-1 and ISO/IEC 9834-8, a universally unique identifier (UUID) as defined in ISO/IEC 9834-8, or a uniform resource identifier (URI) as defined in RFC 2396. Further, in an embodiment, the biometric data 139 that is processed using a biometric sample 132 provided by an individual is associated with the base biometric reference template 140 and is included in the biometric reference template 140 itself, shown as base biometric data 146. In an embodiment, the biometric data 146 stored within the biometric reference template 140 is encrypted or protected in some manner, such as signing the entire biometric reference template 140, as discussed further herein below. The digital signature (reference numeral 148) for the biometric reference template 140 is shown in dotted lines to imply that the signature 148 is detached from the biometric reference template 140. However, in an alternative embodiment, the signature 148 may be attached to the biometric reference template 140 itself. In an embodiment, the biometric reference template 140 includes an identifier component "biometric type indicator" (reference numeral 144) that provides an indication of the type of biometric data used to create the biometric reference template, for example, a fingerprint, iris or retinal scan, etc. Further, the biometric reference template 140 may include other attributes, such as a privacy policy attribute, which includes a unique privacy policy identifier that identifies a privacy policy that is associated with the biometric reference template 140, such that, the privacy policy informs a recipient of the intended and proper handling and use of the information contained in the biometric reference template 140. In an embodiment, the base biometric reference template 140 that is created using a biometric sample 132 provided by a user is stored in a biometric database 120 within the computer system 102 along with other base biometric reference templates 128 created for other users or individuals within the computer system. In an embodiment, each of the base biometric data contained in the biometric reference templates 124 stored within database 120 within the computer system 102 is encrypted to protect the identities of the individuals that the biometric reference templates 128 belong to. Further, in an embodiment, each of the base biometric reference templates 124 is signed with a digital signature before being stored in the database 120, and the digital signature(s) (reference numeral 126) are also stored in database 120. In an embodiment, a RSA digital signature scheme is used to sign the biometric reference template, such that, the digital signature provides integrity protection and origin authenticity over the entire biometric reference template 140. As such, a digital signature can be used to detect if any of the biometric reference template information has been tampered with. In particular, the act of digitally signing the entire biometric reference template cryptographically binds every component within the biometric reference template together. Further, if the biometric reference template contains any attributes, then such attributes are also cryptographically bound to the biometric reference template. In an embodiment, to form a digital signature on an information object, such as, a biometric reference template, a cryptographic hash (also referred to herein as "encrypted hash" or "hash value" or simply "hash") is computed over the entire object or biometric reference template and then the hash is signed. For instance, where a RSA digital signature scheme is used to sign a biometric reference template, a key is used to encrypt the hash to form the digital signature. Furthermore, in an embodiment, the signed biometric reference template is stored along with the digital signature in a database, for instance, database 120. However, the signed biometric reference template and the digital signature may be stored separately within the computer system 100, as shown. Furthermore, the digital signature may be detached from the biometric reference template (as shown by reference numeral 148) or may be attached or coupled to the biometric reference template. The use of digital signatures to sign objects to be authenticated is well known in the art and, as such, will not be discussed further herein. It should be understood, however, that although not shown, other hardware and software components (e.g., additional computer systems, routers, firewalls, etc.) could be included in infrastructure 100.

Figure 2:
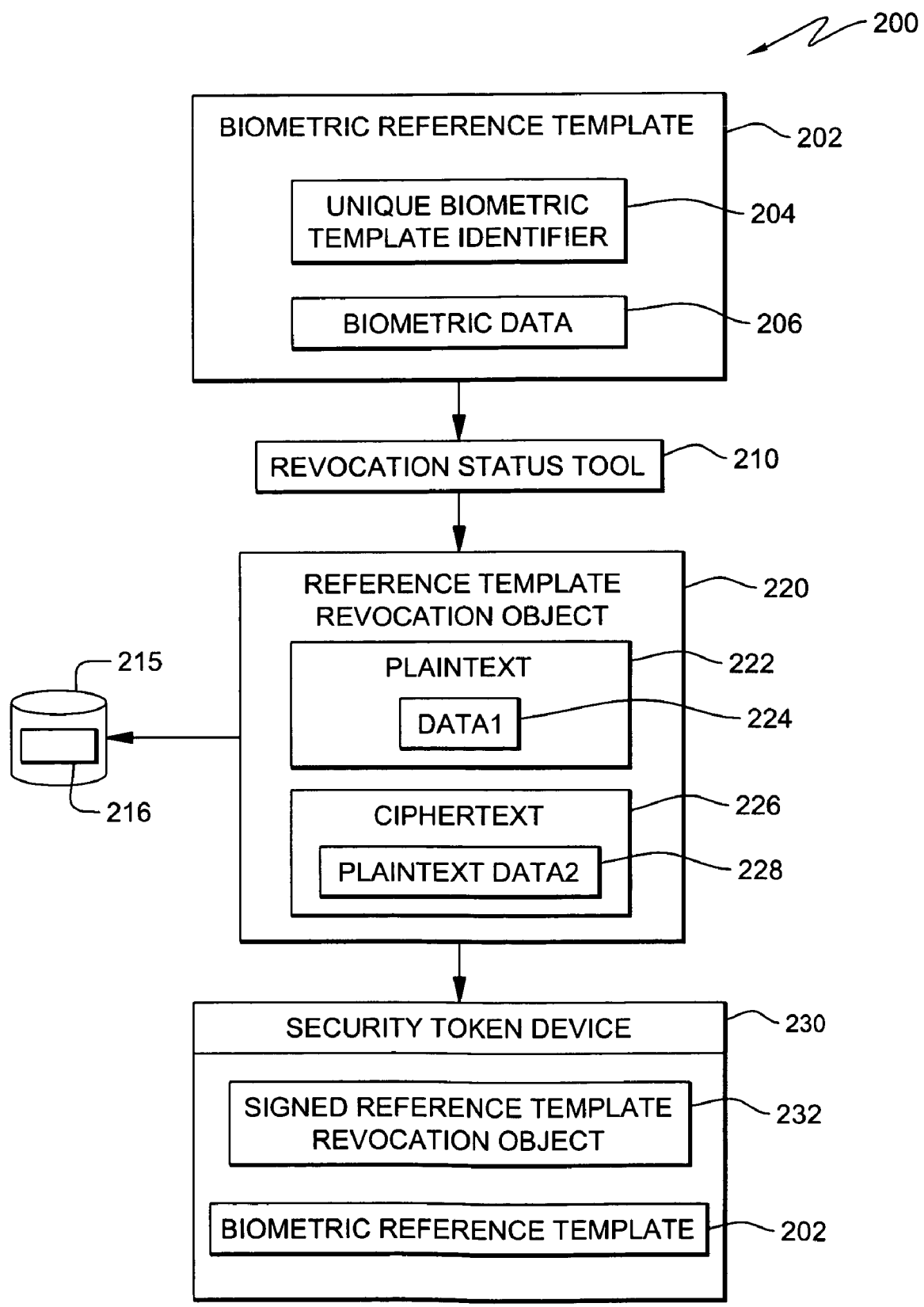
FIG. 2 is a block diagram depicting an embodiment of a computer system for generating an embodiment of a reference template revocation object that is injected into a security token device for use in checking the revocation status of a biometric reference template, in accordance with an embodiment of the present invention.
Figure 3:
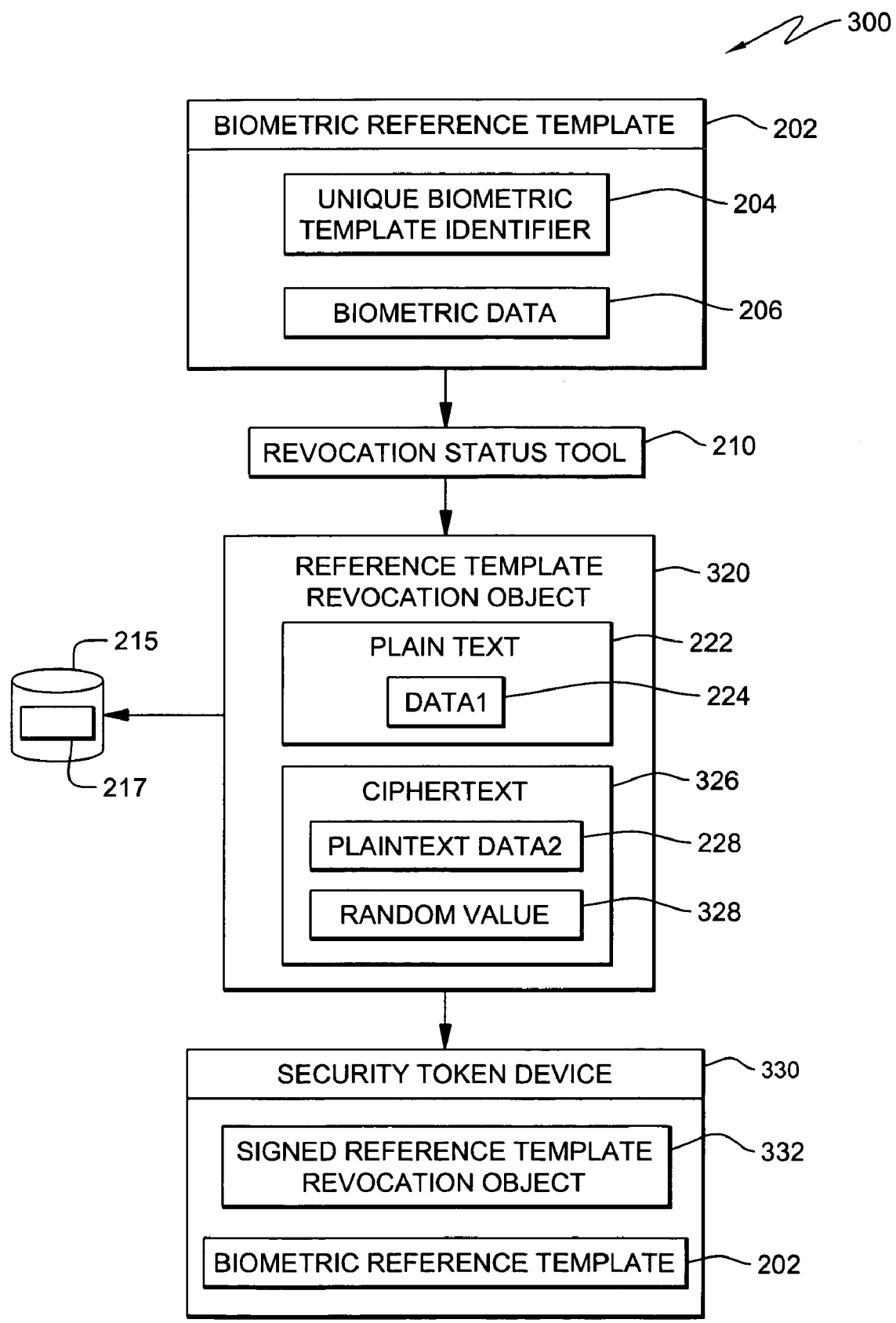
FIG. 3 is a block diagram depicting an embodiment of a computer system for generating another embodiment of a reference template revocation object that is injected into a security token device for use in checking the revocation status of a biometric reference template, in accordance with an embodiment of the present invention.

Reference is now made to FIGS. 2 and 3, which show respective block diagrams depicting aspects of a computer system having a biometric application for generating a reference template revocation object that is injected into a respective security token device for use in checking the revocation status of a biometric reference template. In particular, FIG. 2, reference numeral 200, depicts one embodiment of a reference template revocation object 220 created by the computer system 200 having deployed thereon a revocation status tool for use in checking the revocation status of a biometric reference template, whereas, FIG. 3, reference numeral 300, depicts another embodiment of a reference template revocation object for use in checking the revocation status of a biometric reference template, in accordance with respective embodiments of the present invention. As such, components in FIG. 3 that are the same components as shown in FIG. 2 are labeled with the same reference numerals. Referring to FIGS. 2 and 3, the biometric reference template 202 that is created using a user or individual's biometric sample collected (as discussed herein above with respect to FIG. 1) is assigned a unique biometric reference template identifier 204 and further contains the base biometric data 206 processed from the biometric sample using the biometric application 106. Further, in an embodiment, a biometric reference template issuer or proxy uses the biometric reference template 202 as input into a revocation status tool 210 deployed within the biometric system 200. The revocation status tool 210 creates or generates the respective reference template revocation objects 220 and 320 (shown in FIGS. 2 and 3, respectively) for use in checking the revocation status of the biometric reference template 202. The reference template revocation objects 220 and 320 that are created for use in checking revocation status of the biometric reference template 202 are separate from the biometric reference template 202. In an embodiment, as shown in FIG. 2, the reference template revocation object 220 contains information in plaintext (reference numeral 222), namely, data1 (reference numeral 224) and information in ciphertext (reference numeral 226) that contains data2, reference numeral 228. As used herein, the term "plaintext" refers to information that is in plain text, whereas, "ciphertext" refers to plaintext that is encrypted, as explained further herein below with respect to FIG. 4. Additionally, in the embodiment shown in FIG. 3, the reference template revocation object 320 contains information in plaintext 222 and information in ciphertext 326, similar to FIG. 2, but in addition to the ciphertext 326 containing data2 (reference numeral 228 as shown in FIG. 2), the embodiment shown in FIG. 3, includes a random value or a nonce 328. A nonce is typically an unpredictable value that changes with time and, as such, is used only once, for instance, when encrypting data, such that, a different ciphertext value is obtained each time the data is encrypted. In an embodiment, the random value or nonce 328 comprises a time and date value of the current time and date. In another embodiment, the random value or nonce 328 comprises a large random number, such as, a 20-byte random value that is used to scramble the plaintext 228 ciphered by the revocation status tool within the biometric system, using an encryption algorithm. Further, in an embodiment, as shown in FIG. 2, the reference template revocation object 220 is stored in a database 215 as reference numeral 216. Similarly, as shown in FIG. 3, the reference template revocation object 320 is stored in a database 215 as reference numeral 217. Moreover, in an embodiment, the reference template revocation object 220 is injected into a security token device 230 (FIG. 2), and in an embodiment, the reference template revocation object is signed (reference numeral 232). Similarly, in an embodiment, the reference template revocation object 320 is injected into a security token device 330 (FIG. 3), and in an embodiment the reference template revocation object is signed (reference numeral 332). Further, in an embodiment, the biometric reference template 202 is also injected into the respective security token devices 230 and 330.

Figure 4A:
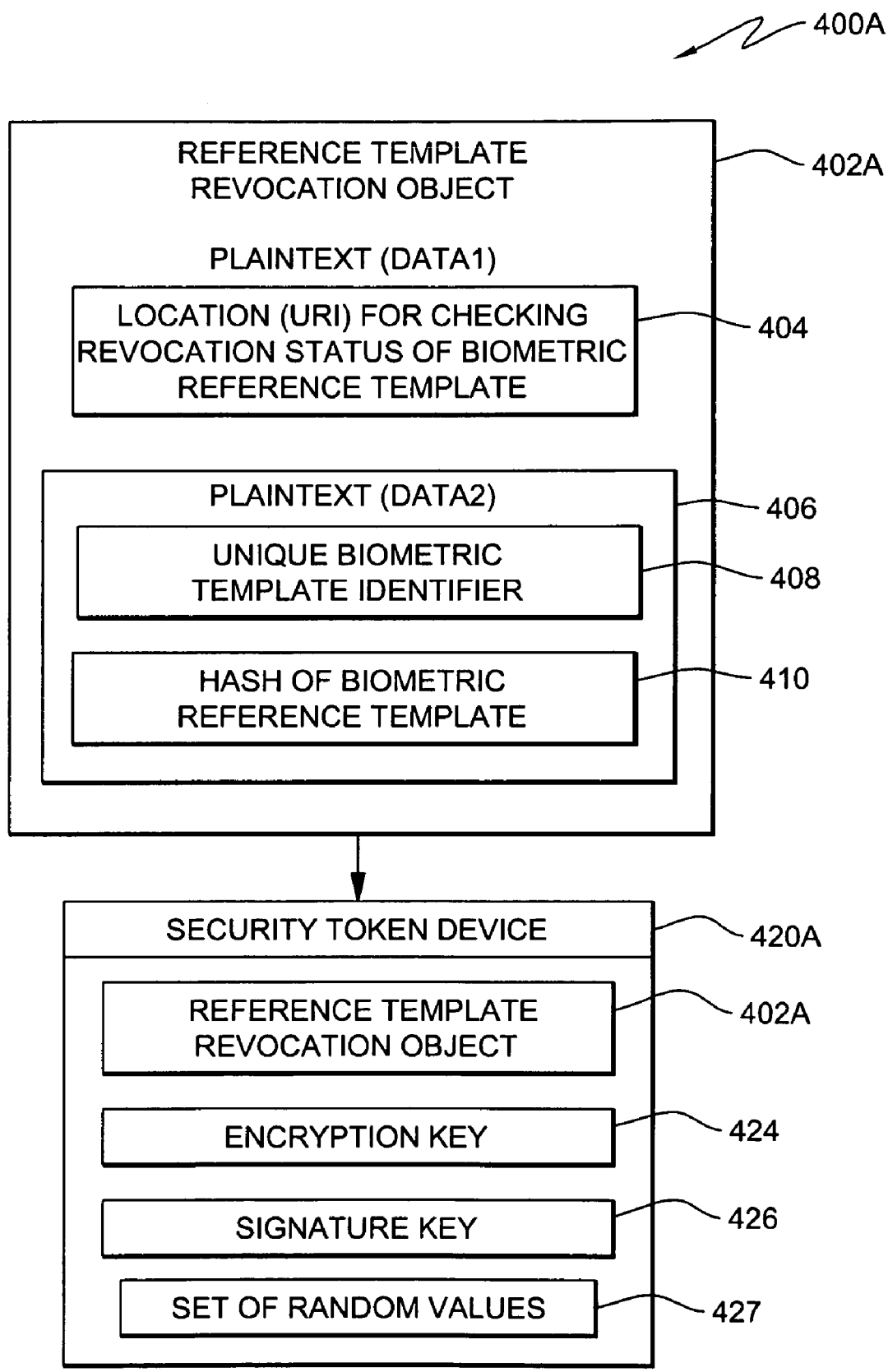
FIGS. 4A and 4B depict respective block diagrams of an embodiment of a reference template revocation object that is injected into a security token device issued to an individual or user by a biometric reference template provider or issuer for facilitating the process of checking the revocation status of a biometric reference template, in accordance with an embodiment of the present invention.
Figure 4B:
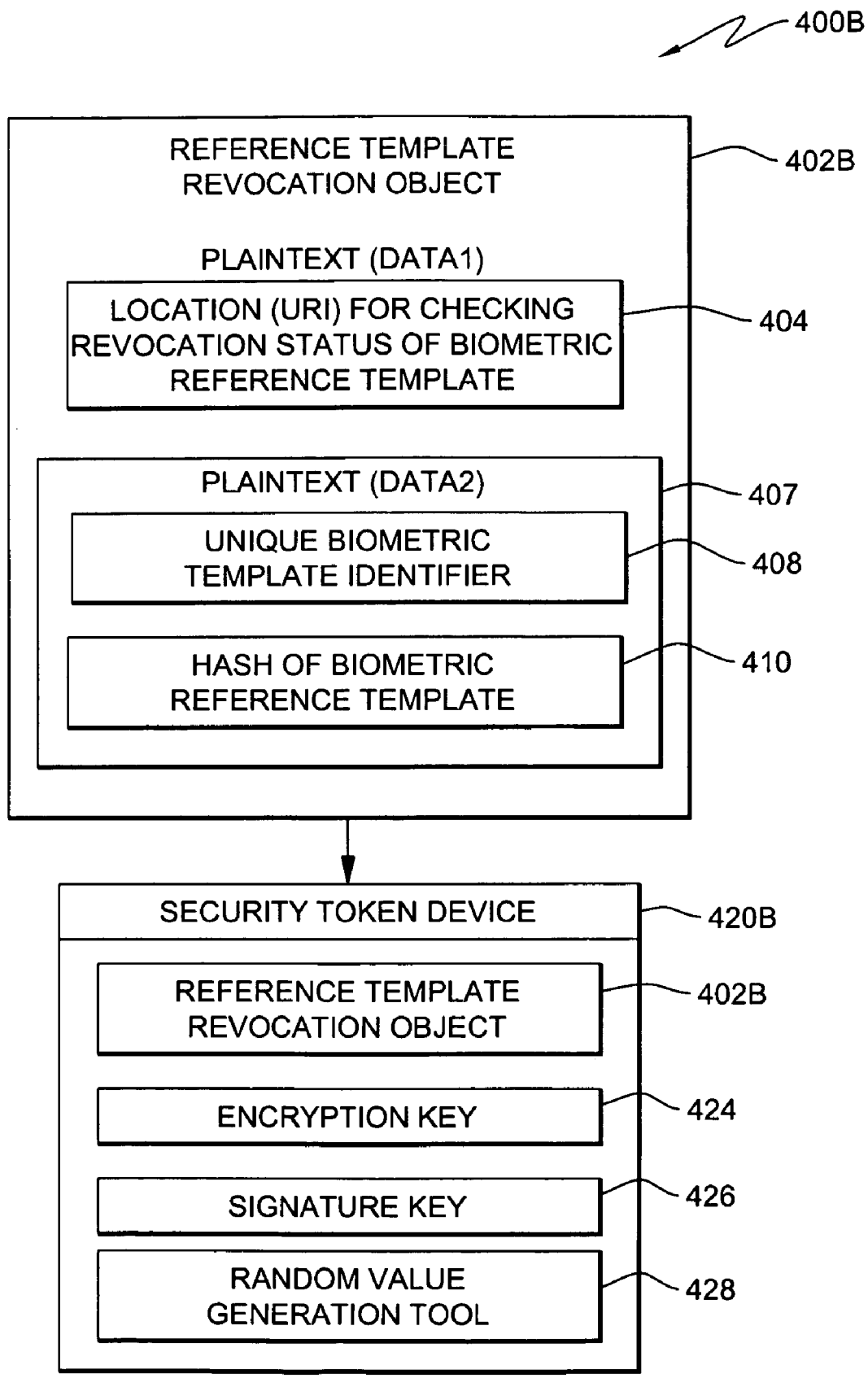

Reference is now made to FIGS. 4A and 4B, reference numeral 400A and 400B, which depict respective block diagrams of an embodiment of a reference template revocation object injected into a security token device issued to an individual or user by a biometric reference template provider or issuer for facilitating the process of checking the revocation status of a biometric reference template, in accordance with an embodiment of the present invention. In particular, FIG. 4A, reference numeral 400A, depicts one embodiment of a reference template revocation object 402A created by the biometric system 200 for use in checking the revocation status of a biometric reference template, whereas, FIG. 4B, reference numeral 400B, depicts another embodiment of a reference template revocation object 402B for use in checking the revocation status of a biometric reference template, in accordance with respective embodiments of the present invention. As such, components in FIG. 4B that are the same components as shown in FIG. 4B are labeled with the same reference numerals. Turning to FIG. 4A, the reference template revocation object 402A contains plaintext data1 (reference numeral 404) and plaintext data 2 (reference numeral 406), which contains plaintext data2 that is to be ciphered. In an embodiment, the information or data1 in plaintext 404 provides the location, for instance, a URI (Uniform Resource Identifier) for use in checking the revocation status of a biometric reference template. In an embodiment, the information or data2 contained in plaintext 406 includes a unique biometric reference template identifier 408 that uniquely identifies the biometric reference template, and further, the information or data2 that is to be ciphered includes a hash value 410 computed over the biometric reference template. In particular, the hash value is computed over the entire biometric reference template whose revocation status is to be checked using the reference template revocation object 402A, such that, a digital signature can be used to detect if any of the biometric reference template information has been tampered with. Further, as shown in FIG. 4A, the reference template revocation object 402A is injected into a security token device 420A, which in an embodiment is a portable token device that is issued to an individual or person corresponding to the biometric reference template whose revocation status is to be checked. Furthermore, in an embodiment, the security token device 420A includes an encryption key 424 for encrypting or enciphering the plaintext 406 and includes a signature key 426 for signing the reference template revocation object 402A. Additionally, in an embodiment, a set or pool of random values or nonces 427 are injected into the security token device 420A, where the security token device 420A cycles through the pool of random values 427 for scrambling the encryption value of the plaintext 406, such that a different encryption value is generated each time, which prevents the individual from being tracked by a constant encrypted value. Referring to FIG. 4B, the reference template revocation object 402B, contains plaintext information or data1 (reference numeral 404) and plaintext information or data 2 (reference numeral 407). In an embodiment, the information in plaintext data1 404 in FIG. 4B provides the location, for instance, a URI (Uniform Resource Identifier) for use in checking the revocation status of a biometric reference template. Further, in an embodiment, shown in FIG. 4B, the plaintext data2 (reference numeral 407) includes a unique biometric reference template identifier 408 and a hash value 410 computed over the biometric reference template. Again, the reference template revocation object 402B is injected into a security token device 420B, such as, a portable token device that is issued to an individual or person corresponding to the biometric reference template whose revocation status is to be checked. Further, in an embodiment, the security token device 420B includes an encryption key 424 for encrypting or ciphering the plaintext data2 407 and also includes a signature key 426 for digitally signing the reference template revocation object 402B. Further, the security token device 420B includes a random value or nonce generation tool or engine 428 for generating a random value or nonce that is added to the plaintext data2 that is ciphered to create ciphertext from plaintext data2, such that, the encryption or cipher value of the ciphertext is not static, but changes each time the plaintext is ciphered. As such, the biometric reference template provider or issuer can inject into a security token device 420B containing the reference template revocation object and can place all of the elements needed to check the revocation status of a biometric reference template on the security token device (such as, 420B) that is issued to the individual corresponding to the biometric reference template. Thus, the holder of the token device 420B uses the random value generation tool 428 to add a different random value or nonce to the plaintext data2 each time the individual provides the reference template revocation object to an entity who wishes to check the revocation status of an individual's biometric reference template. The holder can cipher or encrypt the plaintext along with the random value or nonce and can sign the reference template revocation object and hand or transmit the reference template revocation object to the relying party.

Figure 5:
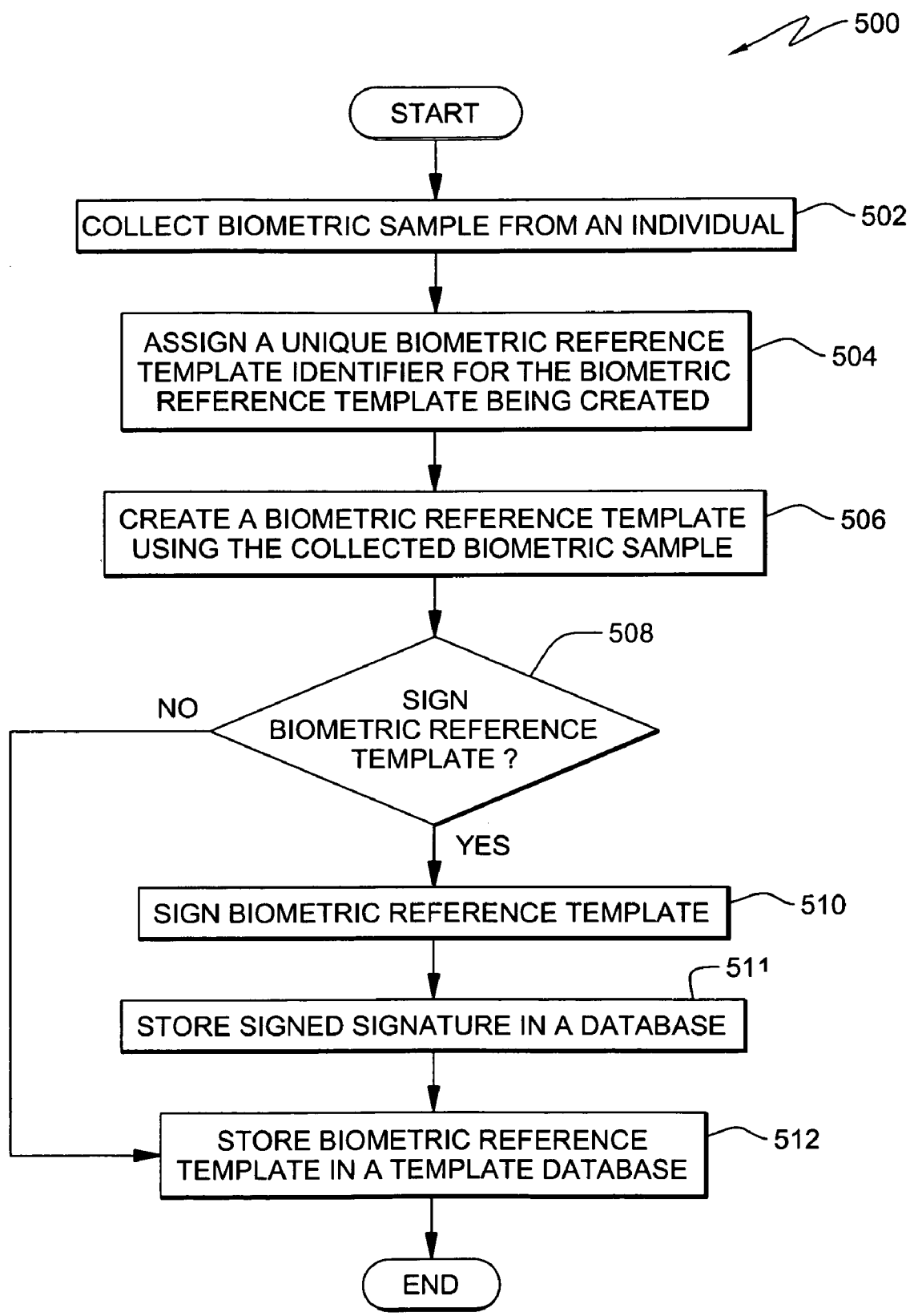
FIG. 5 depicts a flowchart outlining the steps for creating a biometric reference template from a biometric sample collected from a user or individual, in accordance with an embodiment of the present invention.
Figure 6:
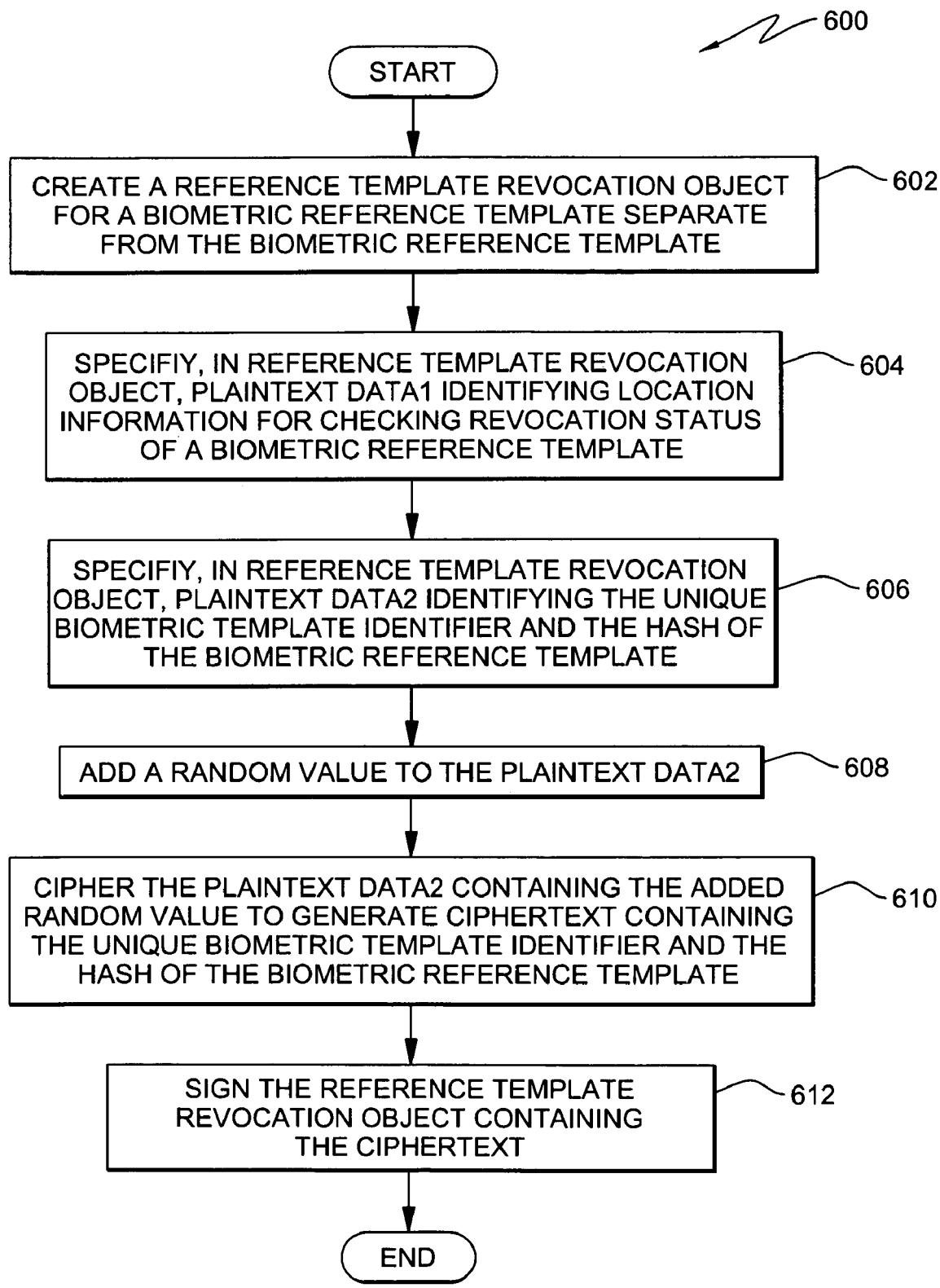
FIG. 6 depicts a flowchart outlining the steps for creating a signed reference template revocation object for use in checking the revocation status of a biometric reference template, in accordance with an embodiment of the present invention.
Figure 7:
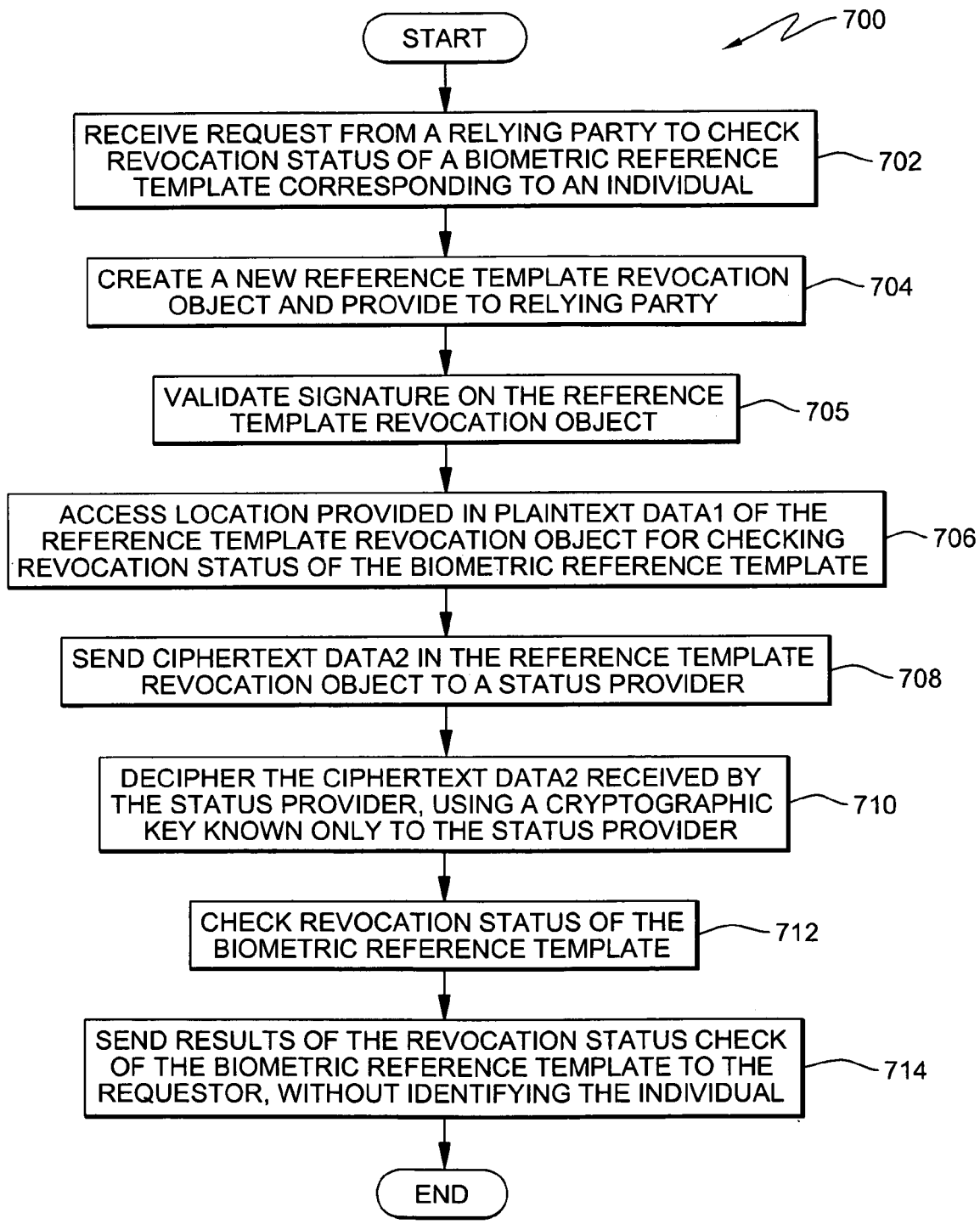
FIG. 7 depicts a flowchart outlining the steps for use in checking the revocation status of a biometric reference template, using a reference template revocation object created for the biometric reference template, in accordance with an embodiment of the present invention.

In another embodiment, the invention provides a method for generating a reference template revocation object for use in checking the revocation status of a biometric reference template, in accordance with an embodiment of the present invention. Reference is now made to FIGS. 5 through 7, which together outline the steps for generating a reference template revocation object for use in checking the revocation status of a biometric reference template. Turning to FIG. 5, reference numeral 500, depicts a flowchart outlining the steps for generating a base biometric reference template or simply biometric reference template using a biometric sample collected from a user or individual in accordance with an embodiment of the invention. Referring to FIG. 5, the process begins with a biometric application within a biometric reader or scanner device collecting in step 502 a biometric sample from an individual to create a base biometric reference template within the biometric system. In step 504, a unique biometric reference template identifier is assigned to the base biometric reference template being created and the biometric reference template is created in step 506 using the biometric sample collected from the individual and the unique biometric reference template identifier. In step 508, a determination is made by the biometric application as to whether or not to sign the base biometric reference template created. If the biometric reference template is to be signed, then the biometric reference template is signed in step 510 using a digital signature. Further, in an embodiment, the signature for the biometric reference template is stored in a database in step 511. Furthermore, the base biometric reference template is stored in a database in step 512 within the biometric system, ending the process. In an embodiment, the signature is appended to the biometric reference template and is stored in a database within the biometric system. Further, in an embodiment, the signature is coupled or associated with the biometric reference template and is stored in a database. In another embodiment, the signature is detached from the biometric reference template and is stored separately along with the biometric reference template in a database within the biometric system, ending the process. However, going back to step 508, if a determination is made that the base biometric reference template is not to be signed, then the base biometric reference template is stored in a database in step 512 within the biometric system, ending the process.

Turning to FIG. 6, reference numeral 600 depicts a flowchart outlining the steps for creating a signed reference template revocation object for use in checking the revocation status of a biometric reference template, in accordance with an embodiment of the present invention. Referring to FIG. 6, the process beings with a biometric service provider or biometric reference template issuer creating, in step 602, a reference template revocation object for a biometric reference template, which is separate from the biometric reference template. In an embodiment, the biometric reference template issuer creates the reference template revocation object that is separate from the biometric reference template, using a revocation status tool provided by a biometric application for a biometric system. In step 604, the template issuer specifies in the reference template revocation object data1 in plaintext that identifies location information for use in checking revocation status of a biometric reference template. Further, in step 606, the template issuer specifies in the reference template revocation object data2 in plaintext that identifies the unique biometric reference template identifier corresponding to the biometric reference template created and specifies the hash of the biometric reference template. Further, in an embodiment, in step 608, a random value or nonce is added to the plaintext data2, namely the data identifying the biometric reference template identifier corresponding to the biometric reference template and the hash value of the biometric reference template. In step 610, the revocation status tool ciphers the plaintext data2, which includes the random value or nonce to generate ciphertext containing the biometric reference template identifier and the hash value of the biometric reference template. Furthermore, in step 612 the biometric reference template issuer signs the reference template revocation object containing the ciphertext data, ending the process. In an embodiment, the entire reference template revocation object is signed by the template issuer and the signed reference template revocation object is stored in a database within the biometric system. In another embodiment, steps 608, 610 and 612 are performed on a security token after the issuer has inserted the components of a reference template revocation object, a set of random values, an encryption key, and a signature key into the security token device. This allows the token holder to create and present a newly formed and unique reference template revocation object each time the reference template revocation object is presented to a relying party.

Reference is now made to FIG. 7, reference numeral 700, which depicts a flowchart outlining the steps checking the revocation status of a biometric reference template, using a reference template revocation object created for the biometric reference template, in accordance with an embodiment of the present invention. The process begins in step 702 with an individual or security token device holder (referred to as "token holder") receiving a request from a relying party to check the revocation status of a biometric reference template corresponding to the template holder or individual. In step 704, the token holder uses the security token device to create a new reference template revocation object, signs the reference template revocation object and provides the reference template revocation object to the relying party. In step 705, the revocation status tool validates the signature on the reference template revocation object. Further, in step 706, the revocation status tool within a biometric system accesses the location provided in data1 in plaintext of the reference template revocation object for use in checking the revocation status of the biometric reference template. The revocation status tool sends the ciphertext data2 in the reference template revocation object to a revocation status provider within the biometric system in step 708. Further, in step 710, the revocation status provider deciphers the ciphertext data2 received, using a cryptographic key known only to the status provider and to the individual corresponding to the reference template revocation object. In step 712, the status provider checks the revocation status of the biometric reference template identified using the plaintext recovered from the ciphertext in data2, and sends the results of the revocation status check of the biometric reference template to the requester in step 714, without identifying any information pertaining to the biometric reference template belonging to the individual and, by proxy, the individual, ending the process.

Figure 8A:
FIGS. 8A-8C together depict an embodiment for defining a reference template revocation object, in accordance with an embodiment of the present invention.
Figure 8B:
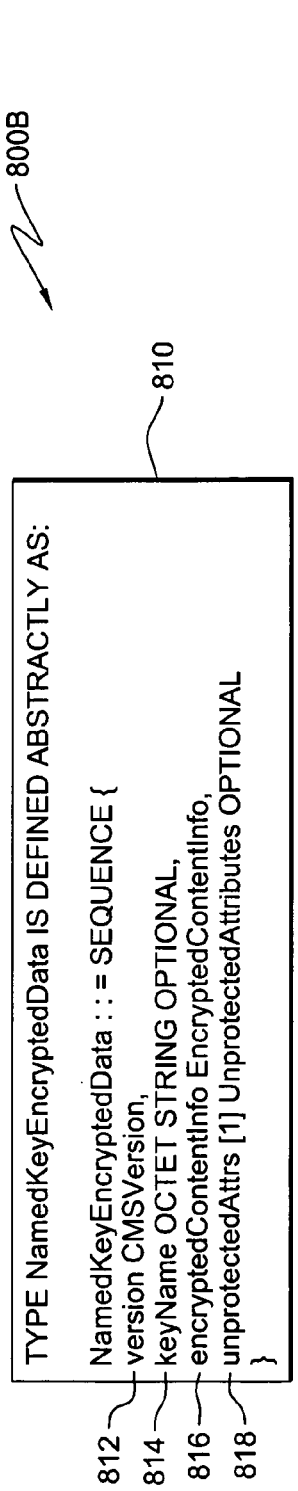
Figure 8C:
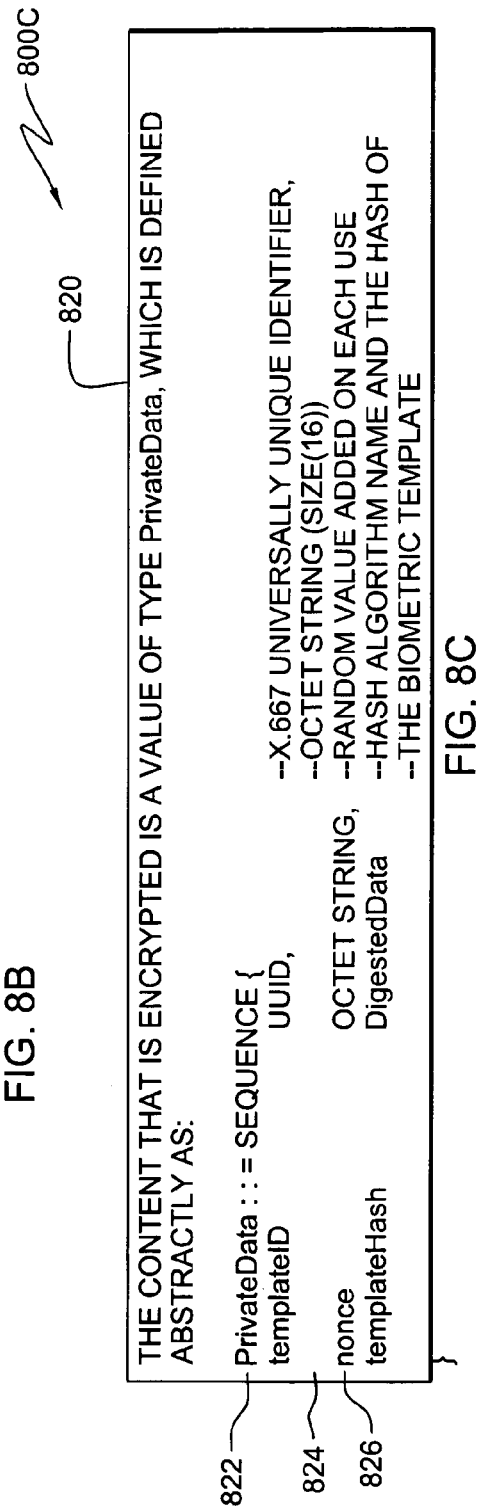

Reference is now made to FIGS. 8A-8C, reference numerals 800A-800C, which together depict an embodiment for defining a reference template revocation object using ASN.1, in accordance with an embodiment of the present invention. As shown in FIG. 8A, reference numeral 800A, a value of type TemplateRevocationObject (reference numeral 802) would be encoded then input to a digital signature process and signed. This can be as a simple digital signature over the value, a signature using the Cryptographic Message Syntax (CMS) type SignedData, as a Security Assertion Markup Language (SAML) assertion, by use of the XML Access Control Markup Language (XACML), or by using some other syntax and signature process. The templateID component (reference numeral 804) of type TemplateRevocationObject (reference numeral 802) comprises a Uniform Resource Identifier (URI) that can be used to locate or identify a resource over a network, such as, the World Wide Web. This value provides a relying party the location where the revocation status of a biometric reference template can be checked. In an embodiment, the URI comprises a query string whose format is as follows:
?value
where the "value" is a value of type TemplateRevocationObject encoded using the canonical version of the ASN.1 XML Encoding Rules (XER). Further, the privateIdentifiers component (reference numeral 806) of type TemplateRevocationObject (reference numeral 802) comprises a value of CMS type NamedKeyEncryptedData. In an embodiment, a value of this type contains the private information that uniquely identifies the biometric reference template, and by association, the subject or holder of the template. In an embodiment, in the type NamedKeyEncryptedData (reference numeral 810) in FIG. 8B, reference numeral 800B, version (reference numeral 812) comprises the integer version of the NamedKeyEncryptedData syntax. Further, keyName (reference numeral 814) comprises the name of a symmetric key used to encrypt and decrypt the information in the encryptedContentInfo component (reference numeral 816) contains the encrypted content and the encryption algorithm name that can be used to recover the unique biometric reference template identifier and the hash of the biometric reference template. Further, the component unprotectedAttrs (reference numeral 818) are an optional set of unprotected attributes that may be defined in the reference template revocation object. Further, the content that is encrypted, namely data2, comprises a value of type PrivateData, which can be defined as shown in FIG. 8C, reference numeral 800C. The content to be encrypted in the privateIdentifiers component (reference numeral 806) of type TemplateRevocationObject (reference numeral 802) and carried in the encryptedContentInfo component (reference numeral 816) of type NamedKeyEncryptedData (reference numeral 810) comprises a value of type PrivateData (reference numeral 820 in FIG. 8C, reference numeral 800C). The value of type PrivateData (reference numeral 820) contains in component templateID (reference numeral 822), the unique biometric reference template identifier assigned by the template issuer. Further, the nonce component (reference numeral 824) comprises a random value that is added to the content that is encrypted on each use. Furthermore, the templateHash component (reference numeral 826) of type PrivateData contains the hash of the template and the name of the algorithm used to create the hash. This hash is the same value that would be signed if the biometric reference template is signed when the reference template is issued by the template issuer. Once these values have been recovered, the given UUID can be used to identify and locate the biometric reference template whose revocation status is to be checked. The recovered hash can be used to ensure that the UUID identifies the correct reference template and that this reference template has not been modified. Finally, the revocation status can be checked and the results of checking returned to the status requester or relying party.

Accordingly, the invention provides a system, method and a program product for generating a reference template revocation object for use in checking the revocation status of a biometric reference template, as described herein above. Rather than having the template issuer sign a remote status service attribute containing information on how to check the revocation status of the template while signing the template (as described in X9.84), a separate signed object, a template revocation object, is created by the template issuer or their proxy. The template revocation object contains clear text (not encrypted) information on the location a relying party can use to check the revocation status of the reference template, while protecting all information that can be used to identify the template holder. Further, the reference template revocation object also contains the cipher text (encrypted) of the UUID that uniquely identifies the reference template and the unique cryptographic hash of the reference template. This ciphertext is encrypted using a named cryptographic key chosen by and known only to the template issuer or the object signer. Further, a template revocation object can be created by the issuer of a biometric reference template or their proxy. This signed object is separate from the template, which itself may be signed. This separate signed object contains information on the location a relying party should use to check the revocation status of the associated template, and encrypted private information that includes the UUID assigned by the template issuer to uniquely identify the template, and the cryptographic hash of the template. Once recovered, the encrypted private information can be used to identify and determine the revocation status of a given template without revealing any identifier of the template holder.

The foregoing descriptions of specific embodiments of the present invention have been presented for the purpose of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for checking a revocation status of a biometric reference template, said method comprising:
    creating, by a processor of a computer system, a reference template revocation object for the biometric reference template previously generated for an individual, said creating the reference template revocation object comprising: inserting into the reference template revocation object first plaintext data providing a location for checking the revocation status of the biometric reference template, inserting into the reference template revocation object a unique biometric reference template identifier that uniquely identifies the biometric reference template, computing a hash value of the biometric reference template, and inserting into the reference template revocation object the computed hash value of the biometric reference template;
    said processor ascertaining the revocation status of the biometric reference template through use of the reference template revocation object, said ascertaining comprising: obtaining from the reference template revocation object the location, the identifier, and the hashed value, retrieving the biometric reference template, identified by the obtained identifier, at the obtained location, and determining the revocation status based on whether the biometric reference template retrieved at the obtained location differs from the biometric reference template from which the obtained hashed value was computed; and
    said processor returning the ascertained revocation status of the biometric reference template to a relying party that had requested the status of the biometric reference template.

2. The method of claim 1, said method further comprising:
    said processor receiving, from the relying party, a request for the revocation status of the biometric reference template; and
    after said receiving the request and prior to said ascertaining, said processor sending the reference template revocation object to the relying party.

3. The method of claim 1, wherein said ascertaining is performed without revealing an identity of the individual.

4. The method of claim 1, wherein said returning is performed without revealing an identity of the individual.

5. The method of claim 1, said method further comprising:
    said processor inserting into the reference template revocation object a random value for encrypting second plaintext data comprising both the identifier and the computed hash value, said plaintext data being contained in the reference template revocation object.

6. The method of claim 5, said method further comprising:
    said processor encrypting the second plaintext data in the reference template revocation object.

7. The method of claim 5, said method further comprising:
injecting the reference template revocation object into a security token device issued to the individual;
inserting into the security token device an encryption key for performing said encrypting; and
inserting into the security token device a signature key for signing the reference template revocation object.

8. A computer system comprising a processor, a memory coupled to the processor, and a computer readable storage device coupled to the processor, said storage device containing program code configured to be executed by the processor via the memory to implement a method for checking a revocation status of a biometric reference template, said method comprising:
said processor creating a reference template revocation object for the biometric reference template previously generated for an individual, said creating the reference template revocation object comprising: inserting into the reference template revocation object first plaintext data providing a location for checking the revocation status of the biometric reference template, inserting into the reference template revocation object a unique biometric reference template identifier that uniquely identifies the biometric reference template, computing a hash value of the biometric reference template, and inserting into the reference template revocation object the computed hash value of the biometric reference template;
said processor ascertaining the revocation status of the biometric reference template through use of the reference template revocation object, said ascertaining comprising: obtaining from the reference template revocation object the location, the identifier, and the hashed value, retrieving the biometric reference template, identified by the obtained identifier, at the obtained location, and determining the revocation status based on whether the biometric reference template retrieved at the obtained location differs from the biometric reference template from which the obtained hashed value was computed; and
said processor returning the ascertained revocation status of the biometric reference template to a relying party that had requested the status of the biometric reference template.

9. The computer system of claim 8, said method further comprising:
said processor receiving, from the relying party, a request for the revocation status of the biometric reference template; and
after said receiving the request and prior to said ascertaining, said processor sending the reference template revocation object to the relying party.

10. The computer system of claim 8, wherein said ascertaining is performed without revealing an identity of the individual.

11. The computer system of claim 8, wherein said returning is performed without revealing an identity of the individual.

12. The computer system of claim 8, said method further comprising:
said processor inserting into the reference template revocation object a random value for encrypting second plaintext data comprising both the identifier and the computed hash value, said plaintext data being contained in the reference template revocation object.

13. The computer system of claim 12, said method further comprising:
said processor encrypting the second plaintext data in the reference template revocation object.

14. A computer program product, comprising a computer readable hardware storage device having a computer readable program code stored therein, said program code containing instructions configured to be executed by a processor of a computer system to implement a method for checking a revocation status of a biometric reference template, said method comprising:
said processor creating a reference template revocation object for the biometric reference template previously generated for an individual, said creating the reference template revocation object comprising: inserting into the reference template revocation object first plaintext data providing a location for checking the revocation status of the biometric reference template, inserting into the reference template revocation object a unique biometric reference template identifier that uniquely identifies the biometric reference template, computing a hash value of the biometric reference template, and inserting into the reference template revocation object the computed hash value of the biometric reference template;
said processor ascertaining the revocation status of the biometric reference template through use of the reference template revocation object, said ascertaining comprising: obtaining from the reference template revocation object the location, the identifier, and the hashed value, retrieving the biometric reference template, identified by the obtained identifier, at the obtained location, and determining the revocation status based on whether the biometric reference template retrieved at the obtained location differs from the biometric reference template from which the obtained hashed value was computed; and
said processor returning the ascertained revocation status of the biometric reference template to a relying party that had requested the status of the biometric reference template.

15. The computer program product of claim 14, said method further comprising:
said processor receiving, from the relying party, a request for the revocation status of the biometric reference template; and
after said receiving the request and prior to said ascertaining, said processor sending the reference template revocation object to the relying party.

16. The computer program product of claim 14, wherein said ascertaining is performed without revealing an identity of the individual.

17. The computer program product of claim 14, wherein said returning is performed without revealing an identity of the individual.

18. The computer program product of claim 14, said method further comprising:
said processor inserting into the reference template revocation object a random value for encrypting second plaintext data comprising both the identifier and the computed hash value, said plaintext data being contained in the reference template revocation object.

19. The computer program product of claim 18, said method further comprising:
said processor encrypting the second plaintext data in the reference template revocation object.

20. A process for deploying computer infrastructure, said process comprising computer-readable code in a computer system, wherein the code in combination with the computer system is configured to perform a method for checking a revocation status of a biometric reference template, said method comprising:

creating, by a processor of the computer system, a reference template revocation object for the biometric reference template previously generated for an individual, said creating the reference template revocation object comprising: inserting into the reference template revocation object first plaintext data providing a location for checking the revocation status of the biometric reference template, inserting into the reference template revocation object a unique biometric reference template identifier that uniquely identifies the biometric reference template, computing a hash value of the biometric reference template, and inserting into the reference template revocation object the computed hash value of the biometric reference template;

said processor ascertaining the revocation status of the biometric reference template through use of the reference template revocation object, said ascertaining comprising: obtaining from the reference template revocation object the location, the identifier, and the hashed value, retrieving the biometric reference template, identified by the obtained identifier, at the obtained location, and determining the revocation status based on whether the biometric reference template retrieved at the obtained location differs from the biometric reference template from which the obtained hashed value was computed; and said processor returning the ascertained revocation status of the biometric reference template to a relying party that had requested the status of the biometric reference template.

21. The process of claim 20, said method further comprising:

said processor receiving, from the relying party, a request for the revocation status of the biometric reference template; and after said receiving the request and prior to said ascertaining, said processor sending the reference template revocation object to the relying party.

22. The process of claim 20, wherein said ascertaining is performed without revealing an identity of the individual.

23. The process of claim 20, wherein said returning is performed without revealing an identity of the individual.

24. The process of claim 20, said method further comprising:

said processor inserting into the reference template revocation object a random value for encrypting second plaintext data comprising both the identifier and the computed hash value, said plaintext data being contained in the reference template revocation object.

25. The process of claim 24, said method further comprising:

said processor encrypting the second plaintext data in the reference template revocation object.

* * * * *